M. B. METCALF.
REVERSIBLE DRAFT.
APPLICATION FILED SEPT. 30, 1911.
1,025,006.
Patented Apr. 30, 1912.
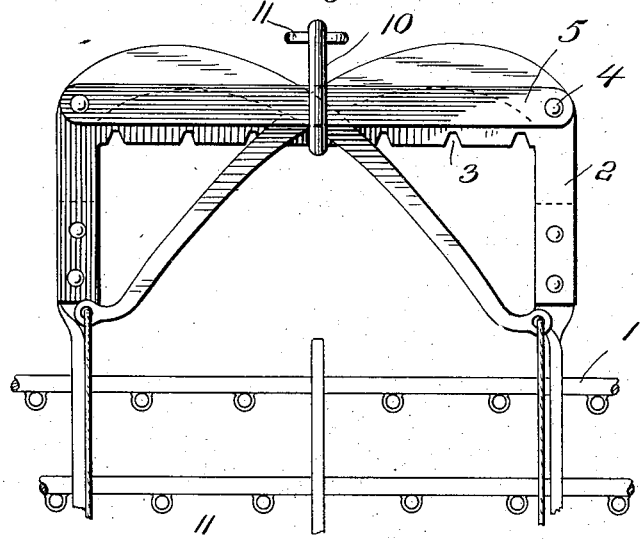
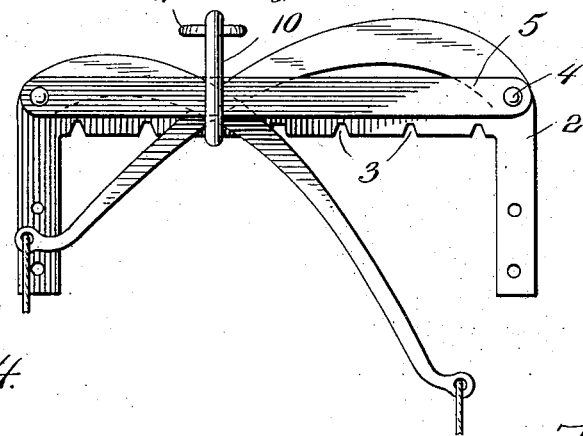
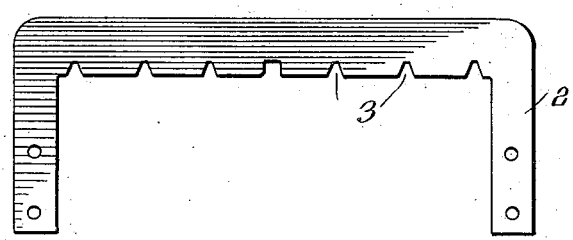
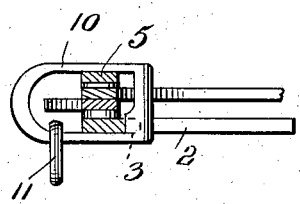
Inventor
Murray B. Metcalf.
Witnesses
William R. Smith
By Victor J. Evans
Attorney

UNITED STATES PATENT OFFICE.

MURRAY B. METCALF, OF COWANESQUE, PENNSYLVANIA.

REVERSIBLE DRAFT.

1,025,006.  Specification of Letters Patent.  Patented Apr. 30, 1912.

Application filed September 30, 1911. Serial No. 652,094.

*To all whom it may concern:*

Be it known that I, MURRAY B. METCALF, a citizen of the United States, residing at Cowanesque, in the county of Tioga and State of Pennsylvania, have invented new and useful Improvements in Reversible Drafts, of which the following is a specification.

This invention relates to reversible draft mechanism for harrows, gang plows or other agricultural instruments to enable the same to be worked upon hill sides without interfering with the work of the instrument or exerting undue labor to the animals attached to the instrument.

With the above objects, and others of a similar nature in view, the invention resides in the novel construction, combination and arrangement of parts set forth in and falling within the scope of the appended claims.

In the drawings,—Figure 1 is a top plan view of the improvement attached to a harrow, showing the draft in one position. Fig. 2 is a similar view showing the draft attaching member being moved to another position. Fig. 3 is a horizontal sectional view of the same. Fig. 4 is a plan view of the frame.

Referring to the accompanying drawings, in which like reference characters designate corresponding parts throughout, the numeral 1 designates, in diagram, a harrow of the ordinary construction.

Secured to the harrow is a substantially U-shaped frame 2, the longitudinal or connecting member of the said frame having its inner face provided with a plurality of notches 3, while the side arms of the frame are attached to the harrow. The notches 3 may be given indicating characters to designate the distance of the throw of a yoke with relation to the central notch, as will hereinafter be more fully set forth.

The connecting member of the frame is provided with suitable studs 4, the same securing a cross bar 5. The studs 4 each pivotally connect a substantially curved lever with the frame. The space between the frame, the levers and the connecting bar is provided with suitable washers, and the levers, as illustrated in the drawings, cross each other and have their free ends provided with openings for the reception of suitable cords, cables or the like whereby one or both of the said levers may be swung upon its pivot.

The central depression of the frame is preferably rectangular, and enlarged, while the remaining depressions are substantially V-shaped, and adapted to be engaged within any of the said depressions is a yoke 10 which carries upon its outer end a ring 11 to which the swingle or double tree is attached. The yoke, of course, is contacted by the levers, and it will be noted that a pull upon the cord or cable attached to either one of the levers will draw the connecting member of the yoke out of its depression and direct it to any one of the remaining depressions of the frame, so that the line of draft is thus changed without the occupant of the farming implement leaving his seat, it being understood that the ropes or cables are of a sufficient length to be attached to the implement and readily accessible to the driver.

Having thus described the invention, what I claim is:—

1. In a device for the purpose set forth, a notched frame, curved levers pivotally connected to the opposite ends of the frame, a yoke adapted to engage one of the notches and to be contacted by one or both of the levers, and flexible elements secured to the levers for swinging the yoke out of one of the notches and into the direction of any of the opposite notches.

2. In a device for the purpose set forth, the combination with a U-shaped frame, the connecting member of the frame having its inner face notched, studs upon the opposite ends of the connecting members, an inwardly curved arm pivotally connected with each of the studs, a connecting bar for the studs, a substantially U-shaped yoke surrounding the connecting bar, the frame and the levers, said yoke adapted to engage within one of the notches, and flexible elements connected with the levers for swinging the yoke out of the notch and directing the yoke toward any of the remaining notches.

In testimony whereof I affix my signature in presence of two witnesses.

MURRAY B. METCALF.

Witnesses:
C. E. LAURENCE,
C. A. PEET.

Copies of this patent may be obtained for five cents each, by addressing the "Commissioner of Patents, Washington, D. C."